US012077300B2

(12) United States Patent
Taddey

(10) Patent No.: US 12,077,300 B2
(45) Date of Patent: Sep. 3, 2024

(54) AIRCRAFT GALLEY

(71) Applicant: Airbus Operations GmbH, Hamburg (DE)

(72) Inventor: Thomas Taddey, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 226 days.

(21) Appl. No.: 17/605,033

(22) PCT Filed: Jun. 29, 2020

(86) PCT No.: PCT/EP2020/068194
§ 371 (c)(1),
(2) Date: Oct. 20, 2021

(87) PCT Pub. No.: WO2020/260678
PCT Pub. Date: Dec. 30, 2020

(65) Prior Publication Data
US 2022/0204164 A1    Jun. 30, 2022

(30) Foreign Application Priority Data
Jun. 28, 2019   (DE) .......................... 102019117500.3

(51) Int. Cl.
*B64D 11/04*     (2006.01)
*G06F 11/30*     (2006.01)

(52) U.S. Cl.
CPC .......... *B64D 11/04* (2013.01); *G06F 11/3013* (2013.01)

(58) Field of Classification Search
CPC ........................... B64D 11/04; G06F 11/3013
See application file for complete search history.

(56) References Cited

U.S. PATENT DOCUMENTS

| 2005/0121978 A1 | 6/2005 | McAvoy |
| 2019/0116394 A1 | 4/2019 | Kinoshita et al. |
| 2020/0062402 A1 | 2/2020 | Godecker et al. |

FOREIGN PATENT DOCUMENTS

| EP | 3471506 A1 | 4/2019 | |
| EP | 2828154 B1 | 3/2020 | |
| JP | 2011131613 | * 12/2009 | ......... B64D 11/0015 |

OTHER PUBLICATIONS

International Search Report and Written Opinion; priority document.

* cited by examiner

*Primary Examiner* — Hongmin Fan
(74) *Attorney, Agent, or Firm* — Greer, Burns & Crain, Ltd.

(57) ABSTRACT

An aircraft galley has a plurality of galley inserts and a master aircraft galley control unit. The galley inserts are connected to the master aircraft galley control unit via an aircraft galley data bus, and at least one panel, wherein the galley inserts each have a status selected from the following group: initialization, standby ON, ON, waiting, interrupted, ended maintenance fault, standby OFF, or stopped/ended. The galley also collects the respective statuses of the galley inserts. The data collector stores information which can be displayed on the panel in accordance with the respective statuses.

17 Claims, 4 Drawing Sheets

Fig. 1 (prior art according to ARINC 812)

AIRCRAFT GALLEY

CROSS-REFERENCES TO RELATED APPLICATIONS

This application claims the benefit of the International Application No. PCT/EP2020/068194, filed on Jun. 29, 2020, and of the German patent application No. 102019117500.3 filed on Jun. 28, 2019, the entire disclosures of which are incorporated herein by way of reference.

FIELD OF THE INVENTION

The present invention relates to an aircraft galley with a multiplicity of galley inserts (GAINs) and a master aircraft galley control unit (MGCU), wherein the galley inserts are connected via an aircraft galley data bus to the MGCU, and a panel, wherein the galley inserts are in each case in a status selected from the following group: initialize, standby ON, ON, waiting, interrupted, finished, maintenance, error, standby OFF or stopped/finished. The present application further relates to an aircraft with a galley of this type.

BACKGROUND OF THE INVENTION

Aircraft galleys of this type and their corresponding interfaces are known from the ARINC 812 standard and are described in detail therein. FIG. 1 shows a basic electrical circuit diagram of a galley according to the prior art with various inserts, referred to as galley inserts ("GAINs"). These catering components comprise, for example, beverage makers, ovens, refrigerators and trash compactors. The GAINs are connected via the galley data bus, a Controller Area Network (CAN) bus, to the master galley control unit (MGCU) which in turn has interfaces to the various aircraft systems (e.g., the flight attendant panel FAP). In addition, the GAINs are also connected to the power supply which can be provided according to specifications from the aircraft systems. In order to save energy, GAINs are often initially set to a desired status (e.g., "On") at a specific time or switch to a status under specific desired conditions (e.g. "Standby" or "Off"). Such statuses are described in detail in the ARINC 812 standard: if, for example, GAINs are to be switched to an operating mode, they first run through the initialization status ("Initialization"). They are then in one of the following statuses: "Standby ON" (GAIN is ready to start processes), "ON", "Waiting", "Interrupted", "Finished", "Maintenance", "Error", "Standby OFF" (GAIN is switched off, but is supplied with power), or "Stopped/Aborted".

There is an increasing need to be able to transport more passengers simultaneously on board an aircraft. This is equally desirable from an ecological, but also an economic, perspective. The desire simultaneously exists to further reduce the number of flight attendants in order to save space and costs. As a result, the remaining flight attendants have a heavier workload. This makes it increasingly difficult to keep track of the inventory of an aircraft galley and the associated catering system (e.g., using a catering trolley) and in addition to operate the galley inserts quickly and professionally.

SUMMARY OF THE INVENTION

An object of the present invention is therefore to provide an aircraft galley in which the crew can be provided with up-to-date information necessary for work processes.

As described above, the aircraft galley according to the invention has a multiplicity of galley inserts (GAINS) and a master aircraft galley control unit (MGCU), wherein the galley inserts are connected via an aircraft galley data bus to the MGCU, and at least one panel, wherein the galley inserts are, in each case, in a status selected from the following group: initialize, standby ON, ON, waiting, interrupted, finished, maintenance, error, standby OFF or stopped/finished. According to the invention, the aircraft galley further comprises a data collector, wherein the data collector is connected to the aircraft galley data bus, so that the data collector collects, i.e., stores, the respective status of the galley inserts, and wherein information which is displayable on the panel depending on the respective status is stored in the data collector.

The at least one panel is preferably a display which is arranged in or at the aircraft galley, i.e., the aircraft galley monument, or its immediate vicinity (e.g., a different monument (partition wall, lavatory, etc.)). A panel of this type can be arranged e.g., in one of the drawers for a galley insert or in a special panel stowage compartment in the galley. Additionally or alternatively, however, the at least one panel can also be arranged on a galley insert. Alternatively or additionally, the panel can be a mobile device. This can be connected, e.g., via a wireless connection (e.g., via TCP/IP (Ethernet/WiFi)), to the data collector. In this way, up-to-date inputs of the crew can also be stored in the data collector (e.g., number of orders) and the data collector can then provide prompt feedback indicating, for example, how long a passenger has to wait for his coffee or whether specific products can no longer be offered or can be offered as alternatives to the passenger.

The data collector can communicate with the GAINs and the MGCU, for example, via TCP/IP through the aircraft galley data bus.

All data transmitted via the galley network from the GAINs to the MGCU (and vice versa) reach the data collector. These data comprise, in particular, the respective status of the individual GAINs. In addition, electronic documentation relating to the handling of the devices and also additional inventory information (e.g., which products are located in which drawer in the aircraft galley, how many products are available, etc.) is stored in the data collector in order to enable context-dependent, i.e., status-dependent, guidance for the use of the GAINs by a flight attendant or a passenger.

In one preferred embodiment of the present invention, the data collector is connected via interception nodes to the aircraft galley data bus. In this way, an aircraft galley can also be retrofitted with a data collector without major restructuring of the wiring having to be undertaken.

Additionally or alternatively, however, the data collector can also be designed as integral with the MGCU in order to enable a space-saving or compact accommodation in the aircraft.

Not only a master aircraft galley control unit (MGCU) can essentially be present in an aircraft galley according to the invention, but additionally one or more further aircraft galley control units (GCUs) also, e.g., for over-installed secondary GAINs also. The distribution in the aircraft galley is essentially designed for a simultaneous operation of all devices. The connected load of the galley therefore limits the number of possible installations. However, it is possible to install additional devices if it is ensured that specific devices are not operated simultaneously. In practice, all devices are never in use simultaneously. In this way, it is then possible to install additional devices, even though the total sum of the maximum individual powers exceeds the power of the connection. As already described above in connection with the MGCU, the data collector can additionally or alternatively also be integral with at least one of these further GCUs.

In addition, as a retrofit solution, at least one separate network control unit can be connected to the aircraft galley data bus, to which the data collector in turn is then also connected.

It is also possible for the data collector to have a communication connection to a catering trolley and/or a catering system, so that the information stored in the data collector comprises catering trolley data (e.g., quantity of food and drink still available) and/or catering system data. If the catering system or the catering trolley provides a constantly updated inventory list, for example by means of image monitoring or suitable sensors, the crew can quickly respond to passenger wishes. In addition, the variant in which a corresponding panel is integrated into a catering trolley is obviously also conceivable. In this way, requests to the aircraft galley or information from the data collector to the panel can be transmitted with constant updating (e.g., wirelessly, by induction or via the aircraft galley data bus).

The information stored in the data collector is preferably displayable in a predefined temporal sequence depending on one or more statuses. This can be not only GAIN-related, but also flight-phase-dependent, e.g., indications such as "a maximum of three more cappuccinos can be provided before the start of the landing approach" are additionally conceivable.

The panel is furthermore preferably touch-sensitive, so that a space-saving and user-friendly operation is possible without an additional keyboard.

The information preferably comprises operating instructions, preparation instructions, precautionary information, troubleshooting instructions, inventory information, cleaning instructions and/or storage instructions. These can be provided in an intelligent manner, for example by a combination of the statuses of the GAINs and/or a predefined temporal sequence, which can also be determined e.g., by means of a suitable image recognition.

The present application further relates to an aircraft with an aircraft galley of this type. A plurality of aircraft galleys can obviously also be accommodated on board the aircraft which then, however, also have a communication connection to one another via the aircraft galley data bus. As a result, it is then possible, in particular, to resolve bottlenecks in the preparation or missing utensils. The crew in the second galley can, for example, take charge of work peaks in the first galley after they see a corresponding work step on the panel. A second oven is then turned on, for example, or instead of ten cappuccinos being prepared in the first galley, five are prepared in each case in the first and second galley.

BRIEF DESCRIPTION OF THE DRAWINGS

The invention is explained below with reference to the four drawings.

DETAILED DESCRIPTION OF THE PREFERRED EMBODIMENTS

Figure 1:
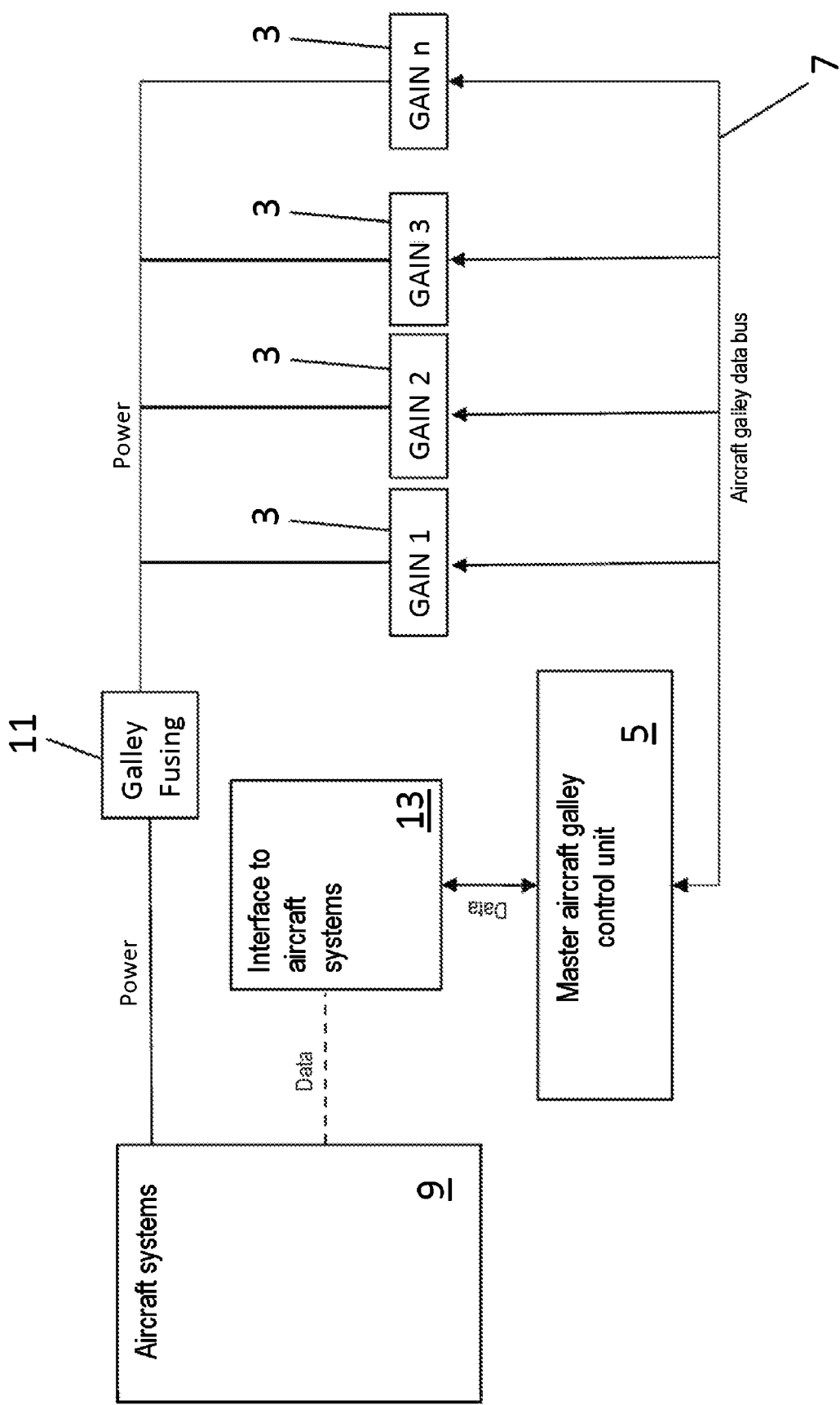
FIG. 1 shows a schematic block diagram of an aircraft galley according to the prior art (ARINC 812).

FIG. 1 shows schematically an aircraft galley designed in accordance with ARINC 812 standard.

The aircraft galley 1 has a multiplicity of galley inserts (GAINs) 3 and a master aircraft galley control unit (MGCU) 5, wherein the galley inserts 3 are connected via an aircraft galley data bus 7 to the MGCU 5. The aircraft galley 1 further has at least one panel. The galley inserts 3 are in each case in a status selected from the following group: initialize, standby ON, ON, waiting, interrupted, finished, maintenance, error, standby OFF or stopped/finished.

By means of an input on an aircraft system 9, such as e.g., a flight attendant panel (or other input panel) or an onboard maintenance system (OMS), etc., a specific quantity of energy is requested and released on the basis of defined specifications (the galley feeder values). This energy is then provided via an electrical distributor 11 (galley fusing) to the galley inserts (GAINs 1, 2, 3, . . . , n) 3. The GAINs 3 in turn transmit, inter alia, their status via the aircraft galley data bus 7 to the MGCU 5. Conversely, the MGCU 5 can also transmit data or commands via the galley data bus 7 to one or more GAIN(s) 3. These data/commands are fed in via a suitable interface 13 of the MGCU 5 with the corresponding aircraft system 9.

Figure 2:
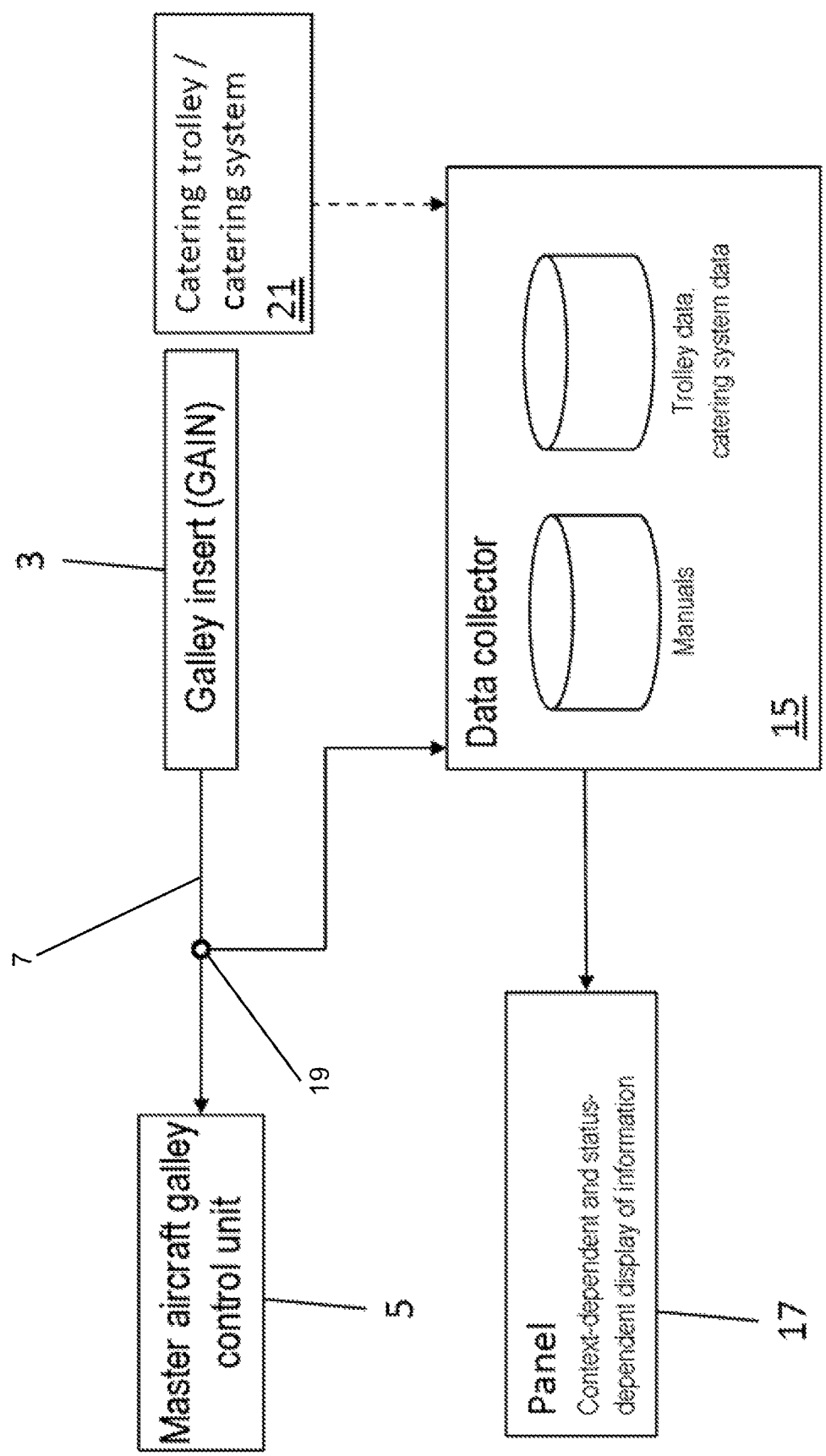
FIG. 2 shows a schematic block diagram of an aircraft galley according to the invention with a data collector.

FIG. 2 shows how a GAIN 3 (only one is shown for the sake of clarity)—as in the ARINC 812 standard—transmits data, in particular the respective standard, to the MGCU 5. According to the invention, the aircraft galley 1 now further comprises a data collector 15 which is connected to the aircraft galley data bus 7 so that the data collector 15 collects the respective status of the GAIN(s) 3. Information which is displayable on the panel 17 depending on the respective status is further stored in the data collector 15. The panel 17 can in turn be arranged on a galley insert 3 or an aircraft galley monument, i.e., the aircraft galley 1 itself, or can also be a mobile device.

In the embodiment shown, the data collector 15 is connected via an interception node 19 to the aircraft galley data bus 7.

In the schematically shown design of the aircraft galley 1 according to the present application, the data collector 15 has a communication connection to a catering trolley and/or a catering system 21, so that the information stored in the data collector 15 comprises catering trolley data and/or catering system data. In this way, the crew can be provided by the data collector 15, e.g., during a catering procedure, with up-to-date information, such as e.g., product-dependent preparation instructions, step-by-step, or essentially also inventory stocks. The connection or information transmission can preferably be implemented by cable, via induction or especially preferably wirelessly, e.g., via TCP/IP (Ethernet/WiFi). For this purpose, the galley 1 can be embedded, for example, in a galley network which, if necessary, can also have a spatial expansion in the aircraft by means of additional Wireless Access Points (WAPs): the catering trolley 21 is moved once, if necessary, along the entire cabin for a catering process.

According to the invention, the information stored in the data collector 15 is displayable on the at least one panel 17 in a predefined temporal sequence depending on one or more statuses. The at least one panel 17 is preferably a touch display, i.e., it is touch-sensitive. This offers the advantage that a space-saving accommodation is possible, since no additional keyboard is required.

The information stored in the data collector 15 can comprise, for example, operating instructions, preparation instructions, precautionary information, troubleshooting instructions and cleaning instructions and/or storage instructions. Inventory information is further regularly updated by means of the catering system 21.

Figure 3:
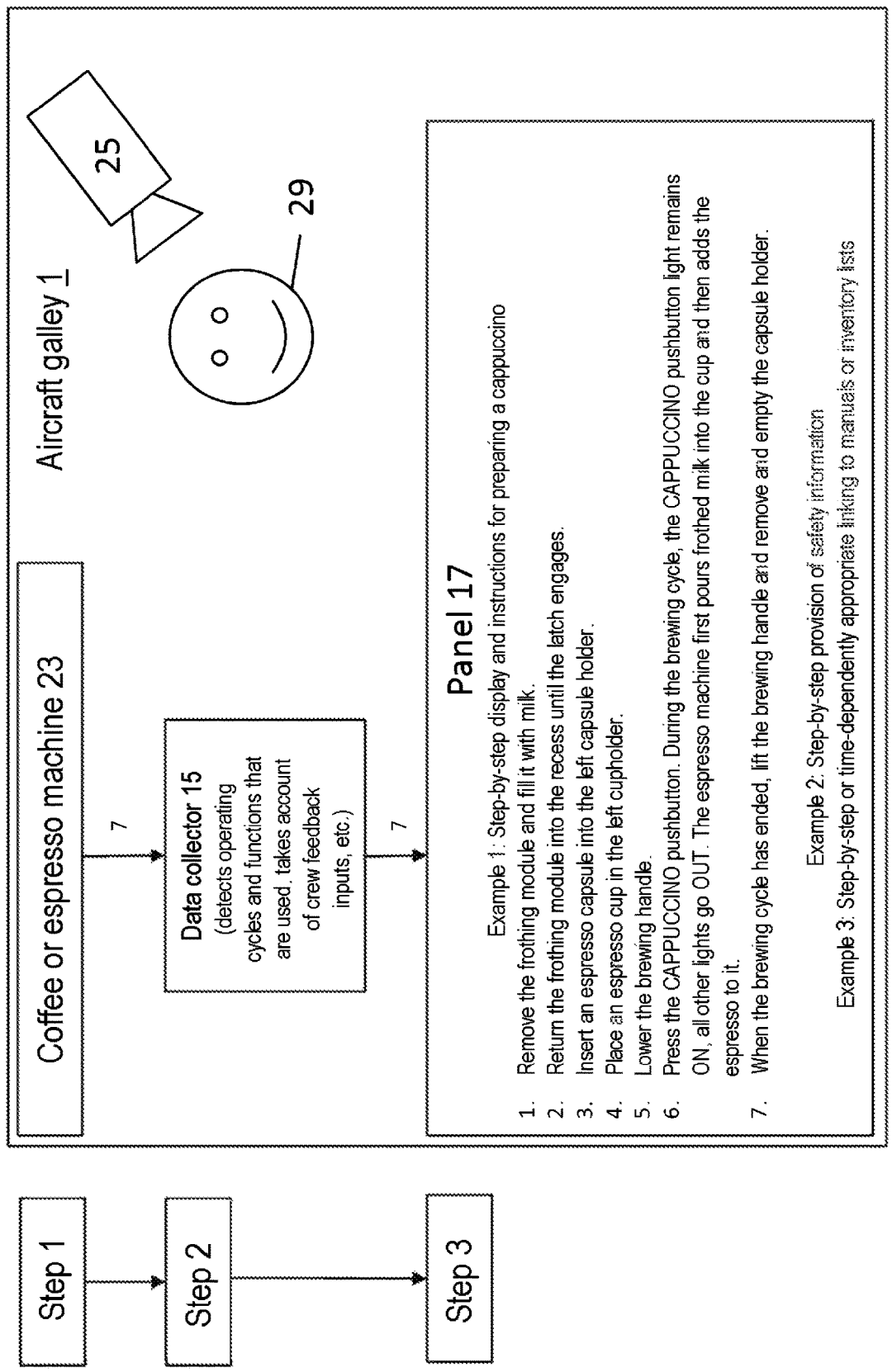
FIG. 3 shows, by way of example, a schematic sequence of information provided in an aircraft galley according to the invention by means of the data collector and depending on the respective status of an espresso machine galley insert.

This can specifically comprise, for example, intelligent step-by-step instructions for specific operating steps (cf. FIG. 3) in which reference is made to useful information at the appropriate time. A coffee or espresso machine 23 as GAIN 3 is mentioned as an example of such a method: After the flight attendant or a passenger has put the machine 23 into operation, i.e., has pressed the pushbutton (step 1), this new status information ("ON") is forwarded via the galley data bus 7 to the data collector 15 (step 2). The data collector 15 then makes information available on the panel 17 (step 3), said information being useful in connection with the operation of the coffee machine 23: e.g., storage locations for milk, coffee pads and cups, inter alia, quantity/deficiency or a link to inventory lists, etc. In addition, the user obtains usage information such as e.g., step-by step instructions, safety information or a link to the manual or other GAINs. In the case of the espresso machine 23, the following displays would therefore appear step-by-step on the panel 17: "Instructions for preparing a cappuccino: 1. Remove the frothing module and fill it with milk. 2. Return the frothing module into the recess until the latch engages. 3. Insert an espresso capsule into the left capsule holder. 4. Place an espresso cup in the left cupholder. 5. Lower the brewing handle. 6. Press the CAPPUCCINO pushbutton. During the brewing cycle, the CAPPUCCINO pushbutton light remains ON, all other lights go OUT. The espresso machine first pours frothed milk into the cup and then adds the espresso to it. 7. When the brewing cycle has ended, lift the brewing handle and remove and empty the capsule holder.".

Especially preferably, the aircraft galley 1 further comprises a camera 25 and suitable image recognition software by means of which it is recognized whether specific instructions have already been carried out and corresponding information is still required. If the user has already placed a cup under the steam nozzle of an espresso machine 23, he obviously no longer needs any information indicating where the cups are located. This information is then no longer presented, and the next step can be displayed instead on the panel 17.

Figure 4:
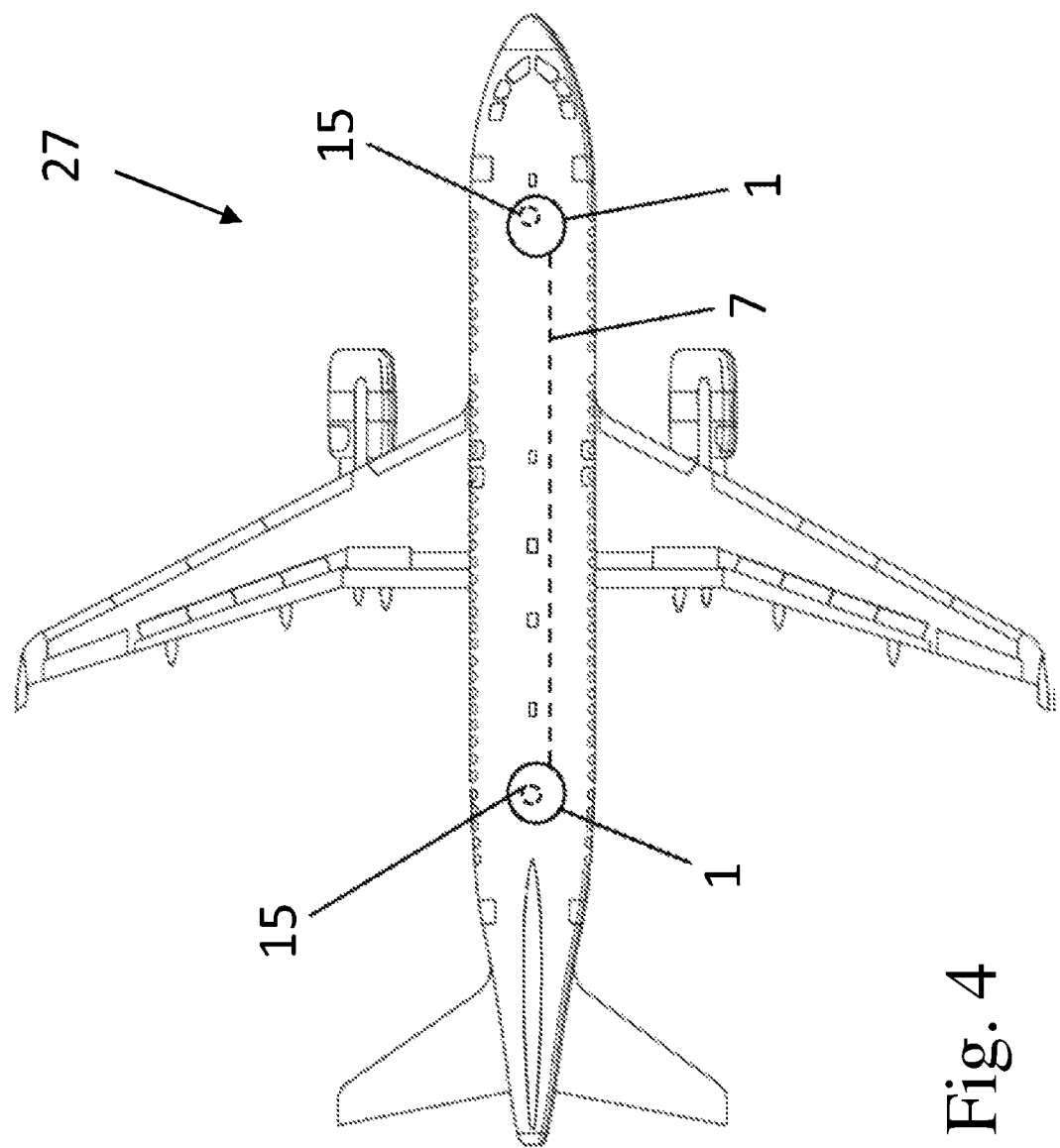
FIG. 4 shows an aircraft with an aircraft galley according to the invention.

Finally, FIG. 4 shows an aircraft 27 in which an aircraft galley 1 according to the invention is arranged. Obviously, a plurality of galleys 1 can essentially be accommodated in one aircraft, the galleys then also being interlinked via the aircraft galley data bus 7 or via a network so that a continuous data exchange between the aircraft galleys 1 is possible and corresponding information stored in the data collector is displayable on the panel depending on the respective status.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMBERS

1 Aircraft galley
3 Galley insert (GAIN) or galley inserts (GAINs)
5 Master aircraft galley control unit (MGCU)
7 Aircraft galley data bus
9 Aircraft system(s)
11 Electrical distributor (galley fusing)
13 Interface of the MGCU to aircraft systems
15 Data collector
17 Panel
19 Interception node
21 Catering trolley and/or catering system
23 Coffee or espresso machine
25 Camera
27 Aircraft
29 Flight attendant or passenger

The invention claimed is:

1. An aircraft galley comprising:
a multiplicity of galley inserts,
a master aircraft galley control unit, wherein the galley inserts are connected via an aircraft galley data bus to the master aircraft galley control unit, and
at least one panel, wherein the galley inserts are, in each case, in a status selected from the following group:
initialize, standby ON, ON, waiting, interrupted, finished, maintenance, error, standby OFF or stopped/ended,
wherein the aircraft galley further comprises a data collector,
wherein the data collector is connected to the aircraft galley data bus so that the data collector collects the respective status of the galley inserts, and
wherein information which is displayable on the panel depending on the respective status is stored in the data collector,
wherein the data collector is connected via interception nodes to the aircraft galley data bus.

2. The aircraft galley as claimed in claim 1, wherein the at least one panel is at least one of arranged on a galley insert, arranged on an aircraft galley monument, or is a mobile device.

3. The aircraft galley as claimed in claim 1, wherein the data collector is configured as integral with the master aircraft galley control unit.

4. The aircraft galley as claimed in claim 1, wherein the data collector is contained in a further aircraft galley control unit.

5. The aircraft galley as claimed in claim 1, wherein the data collector has a communication connection to at least one of a catering trolley or a catering system so that the information stored in the data collector comprises at least one of trolley data or catering system data.

6. The aircraft galley as claimed in claim 1, wherein the information stored in the data collector is displayable in a predefined temporal sequence depending on one or more statuses.

7. The aircraft galley as claimed in claim 1, wherein the panel is touch-sensitive.

8. The aircraft galley as claimed in claim 1, wherein the information comprises operating instructions, preparation instructions, precautionary information, troubleshooting instructions, inventory information, cleaning instructions and/or storage instructions.

9. An aircraft having an aircraft galley as claimed in claim 1.

10. An aircraft galley comprising:
a multiplicity of galley inserts,
a master aircraft galley control unit, wherein the galley inserts are connected via an aircraft galley data bus to the master aircraft galley control unit, and
at least one panel, wherein the galley inserts are, in each case, in a status selected from the following group:
initialize, standby ON, ON, waiting, interrupted, finished, maintenance, error, standby OFF or stopped/ended,
wherein the aircraft galley further comprises a data collector,
wherein the data collector is connected to the aircraft galley data bus so that the data collector collects the respective status of the galley inserts, and
wherein information which is displayable on the panel depending on the respective status is stored in the data collector,
wherein the information stored in the data collector is displayable in a predefined temporal sequence depending on one or more statuses.

11. The aircraft galley as claimed in claim 10, wherein the at least one panel is at least one of arranged on a galley insert, arranged on an aircraft galley monument, or is a mobile device.

12. The aircraft galley as claimed in claim 10, wherein the data collector is configured as integral with the master aircraft galley control unit.

13. The aircraft galley as claimed in claim 10, wherein the data collector is contained in a further aircraft galley control unit.

14. The aircraft galley as claimed in claim 10, wherein the data collector has a communication connection to at least one of a catering trolley or a catering system so that the information stored in the data collector comprises at least one of trolley data or catering system data.

15. The aircraft galley as claimed in claim 10, wherein the panel is touch-sensitive.

16. The aircraft galley as claimed in claim 10, wherein the information comprises operating instructions, preparation instructions, precautionary information, troubleshooting instructions, inventory information, cleaning instructions and/or storage instructions.

17. An aircraft having an aircraft galley as claimed in claim 10.

* * * * *